June 8, 1943.                J. F. WALLACE                2,321,170
                      MULTIPLE-PART ASSEMBLY BOLT
                         Filed May 4, 1942
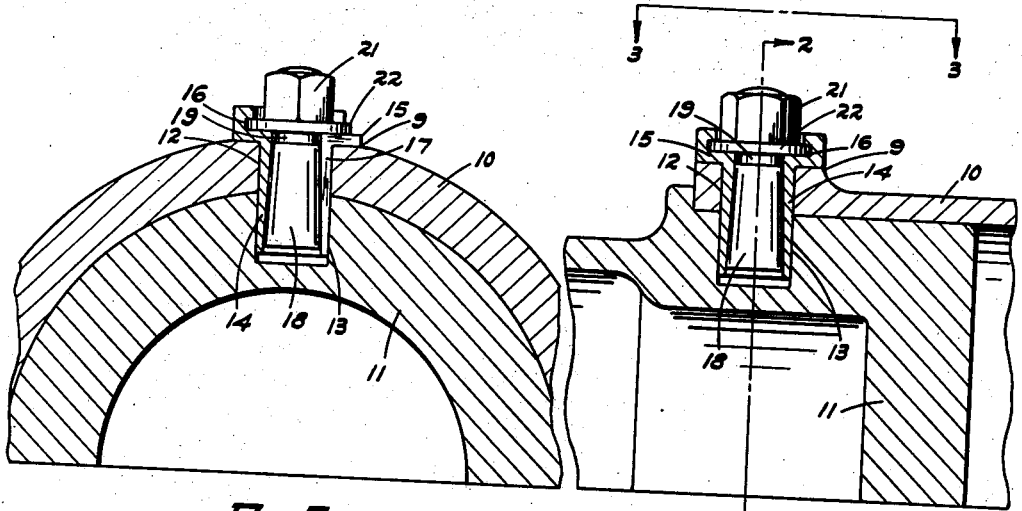
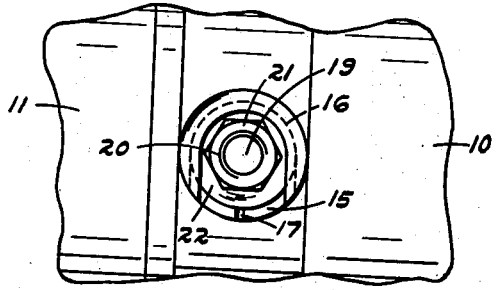
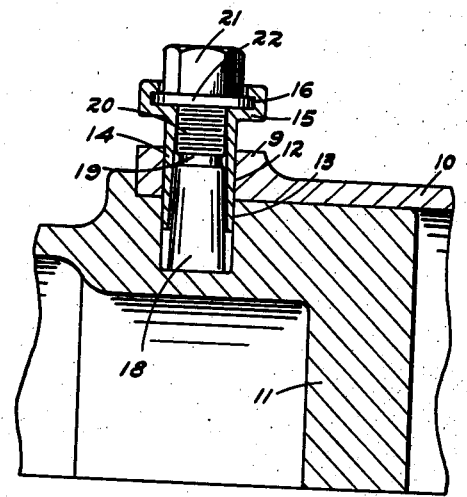
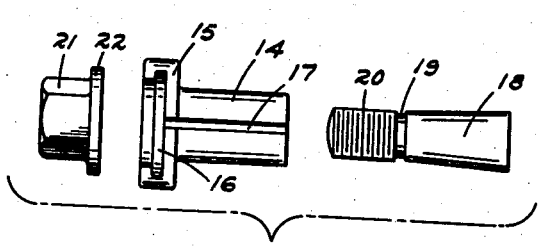
INVENTOR
JOHN F. WALLACE
BY
ATTORNEY Patented June 8, 1943

2,321,170

UNITED STATES PATENT OFFICE 2,321,170

MULTIPLE-PART ASSEMBLY BOLT

John F. Wallace, University Heights, Ohio, assignor to The Cleveland Pneumatic Tool Company, Cleveland, Ohio, a corporation of Ohio Application May 4, 1942, Serial No. 441,627

3 Claims. (Cl. 85—2.4)

This invention relates to improvements in multiple-part assembly bolts. The bolt herein disclosed is shown applied to the joint between the lower end of an airplane air strut and the mounting for the ground wheel thereof. Doubtless, however, it is adapted for various other purposes.

One of the objects of the invention is the provision of a multiple-part assembly bolt which is of simple construction and which is adapted to be easily and rapidly manipulated.

Another object is the provision of a multi-part bolt, the parts of which when assembled are held together against accidental disarrangement.

Another object is the provision of a bolt of this character so designed that the procedure of withdrawing it shall be as easy and rapid as that of inserting and locking it in operative position.

Other objects and features of novelty will appear as I proceed with the description of that embodiment of the invention which, for the purposes of the present application, I have illustrated in the accompanying drawing, in which Fig. 1 is a longitudinal sectional view of a fragment of an air strut showing my improved bolt in operative position.

Fig. 2 is a transverse sectional view taken substantially on the line 2—2 of Fig. 1.

Fig. 3 is a fragmental plan view looking in the direction of arrows 3—3 of Fig. 1.

Fig. 4 is a view similar to Fig. 1 but with the bolt in unlocked condition, as when it is first inserted in the bolt hole or when it is ready to be withdrawn from the hole, and Fig. 5 is a view of the three parts of the bolt disassembled.

In the drawing I have indicated at 10 a fragment of a cylinder of a hydropneumatic shock absorber, such as is commonly employed in air struts for airplanes. The lower end of this cylinder is closed by a head 11 on the upper end of the mounting for the ground wheel of the strut. It is frequently necessary to separate these parts in order to service the shock absorber or the ground wheel mounting. Hence the fastenings employed should be capable of being readily set and withdrawn, as well as being certain and positive in operation.

A plurality of sets of registering holes 12 and 13 are bored in the cylinder and head of the proper size to receive the outer cylindrical surface of a sleeve 14 when the latter is in its normal unexpanded condition. One end of this sleeve, which we will term the outer end, has an annular outwardly projecting shoulder 15 that is adapted to bear against a boss 9 on the cylinder. From the major portion of this shoulder the metal of the sleeve extends longitudinally outward for a short distance and then radially inward to provide a groove 16, but a part of the metal forming this groove is cut away, as shown in Figs. 3 and 5, so that the groove is of U-shape as clearly indicated in Fig. 3. The sleeve 14 and its shoulder 15 are split by a slot 17.

The internal surface of sleeve 14 is tapered from the inner end of the sleeve to the outer end thereof, and is adapted to be engaged by a correspondingly tapered elongated head 18 of a bolt 19 which has a threaded shank 20. The latter is adapted to receive a nut 21 with a base flange or tongue 22 that is proportioned to enter the groove 16 laterally through the opening provided by the sides of the U. The bolt, being inserted into the sleeve through the inner end thereof, engages the threaded opening of the nut and when one or the other or both of these parts are given a few turns all three parts are held together and the device when thus assembled becomes a unit which may be conveniently handled.

The multiple-part assembly bolt assembled for use is shown in Fig. 4. In that condition it is slipped into the registering holes 12 and 13 until the head 18 strikes the bottom of the hole 13. The operator then applies a wrench to the nut 21 and turns the latter down, forcing the sleeve inwardly due to the bearing of the nut flange 22 against the shoulder 15 of the sleeve. When this shoulder strikes the boss 9 the inward movement of the sleeve is interrupted, and the further turning of the nut in the same direction acts to pull the tapered head 18 of the bolt outwardly against the tapered surface of the sleeve, expanding the latter tightly against the walls of holes 12 and 13. When the nut has been turned down in this manner as far as is practicable the parts will be in the position illustrated in Fig. 1 and will be locked together securely. When the bolts are to be dismounted it is necessary merely to unthread the nut 21, which functions first to force the tapered head 18 inwardly or in a direction to permit the sleeve 14 to contract to its natural diameter, thereby freeing itself from tight engagement with the holes 12 and 13. Further movement of the nut in the same direction causes the bolt head 18 to bear against the inner end of hole 13 and then to retract sleeve 14, which further loosens its hold upon the head 18. In these latter operations the flange 22 of the nut bears against the upper side of groove 16.

When the parts are sufficiently loosened the assembly or unit may of course be withdrawn by the fingers of the operator.

The fact that the fastener of this invention is usable in plain unthreaded holes is of course a distinct advantage, as the threading of a bolt and nut is much more readily accomplished than the threading of a hole in a structural member.

While in the foregoing description and in the accompanying drawing I have described and illustrated one particular embodiment of my invention somewhat in detail, it should be understood that such detailed disclosure is for the purpose primarily of complying with the requirements of the statute and that the scope of the invention is to be regarded as defined exclusively by the appended claims.

Having thus described my invention I claim:

1. In a device of the character described, a longitudinally split sleeve with a tapered inner surface, said sleeve having an enlargement at one end with a groove therein running around the sleeve a bolt with a tapered outer surface extended into said sleeve, and a nut for said bolt having a flange extended into said groove, whereby relative longitudinal movement of the nut and sleeve is prevented.

2. In a device of the character described, a longitudinally split sleeve having a tapered inner surface, a bolt with a tapered outer surface extended into said sleeve, an annular flange on one end of said sleeve, said flange having a substantially U-shaped groove formed therein, and a nut for said bolt having a flange adapted to be received in said groove, whereby relative longitudinal movement of the nut and sleeve is prevented.

3. In a device of the character described, a longitudinally split sleeve having a tapered inner surface and a straight outer cylindrical surface, said sleeve having an enlargement at one end with a substantially U-shaped groove formed therein, a bolt with a tapered outer surface extended into said sleeve, and a nut for said bolt having a flange adapted to be received in said groove and rotatable therein, whereby relative longitudinal movement of the nut and sleeve is prevented.

JOHN F. WALLACE.